May 31, 1949.  M. SHULDA  2,471,982
SPLICE FOR CRANKSHAFT BEARINGS
Filed Nov. 4, 1946
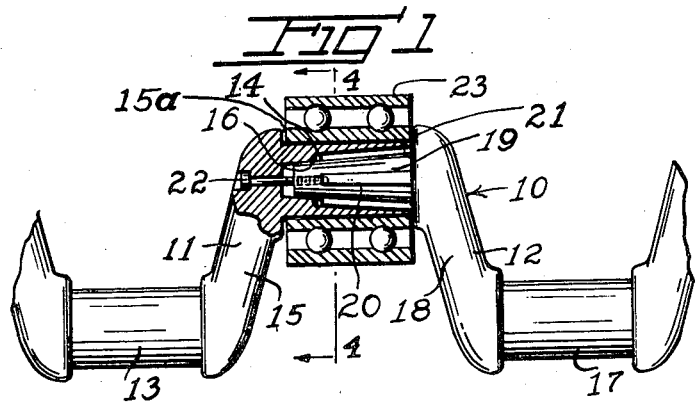
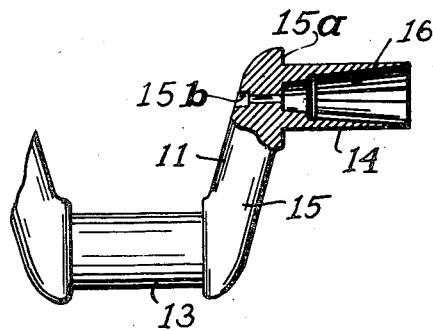
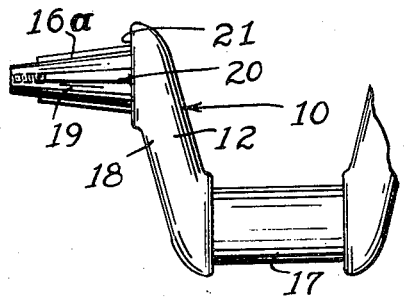
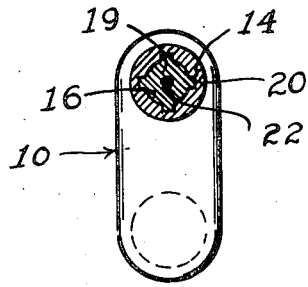
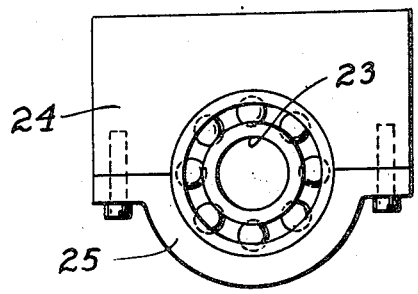
Inventor
Melvin Shulda
By *Wilfred E. Lawen*
Attorney Patented May 31, 1949

2,471,982

UNITED STATES PATENT OFFICE 2,471,982

SPLICE FOR CRANKSHAFT BEARINGS

Melvin Shulda, Cuba, Kans.

Application November 4, 1946, Serial No. 707,726

1 Claim. (Cl. 74—597)

The present invention relates to a crank shaft having three or more crank or wrist pins, and the main object of this invention is now to produce such a machine part in a simple manner to obtain a very strong and durable shaft.

If such a shaft, for instance, has three crank or wrist pins, the middle wrist pin is always difficult both to forge and to machine. One feature of my invention consists now in making two similar forgings for a three bearing crank shaft and splicing them together in the middle bearing.

These and other features and objects of the invention will be easily understood from the subjoined description with the aid of the attached drawing, which forms a part of the application.

One embodiment of the invention is illustrated in the accompanying drawing, wherein like numerals relate to the same details in the different views.

Figure 1 is an assembled side view, partly in section;

Figure 2 is the left half of the crank shaft;

Figure 3 is the right half of said shaft;

Figure 4 is a cross section along line 4—4 of Figure 1; and

Figure 5 shows in side elevation the bearing head and cap provided on the end of the pitman.

Numeral 10 denotes in general the three point bearing of a crank shaft, on which 11 is the left side half and 12 the right side half thereof. To produce said shaft, a forging is made for each half, which halves are similar and made from identical forgings. The left half is shown in Figure 2 where the crank or wrist pin 13 for the left bearing connects with the stub pin 14 forming the middle bearing by means of an arm or web 15. This stub end 14 is cylindrical on the outside of a length corresponding to that of the finished middle crank or wrist pin and has a tapered bore 16 from its outer end terminating at the flat shoulder 15a of the arm or web 15.

The right hand half of the crank shaft shown in Figure 3 has a similar right side wrist pin 17 which connects by means of a web or arm 18 to the stub pin 19 forming part of the middle wrist pin which has a tapered outside surface 16a corresponding to the inside tapering bore 16 of the left half but is of a slightly shorter length than the stub 14. Diametrically opposite each other, four splines 20 are provided reaching from the shoulder 21 to near the end of the stub pin 19, and are intended to engage in the grooves 26 provided in the bore 16 of the stub 14 but slightly shorter than stub 14. These splines and grooves are correspondingly tapered.

In assembling the two halves of the shaft, an antifriction bearing 23 is pressed on around stub end 14. This bearing has a width equal to the length of the stub 14. Care should be taken that the free end of the stub 14 does not abut against the shoulder 21. This will require a small gap or space about $\tfrac{1}{32}$ inch to be provided between the end of the right hand bearing pin 19 and the bottom of the tapered bore 16 of stub 14, and also at the shoulder 21 and end of stub 14. A tightening screw 22 is threaded in the end of the bearing pin 19. This screw is tightly drawn up against the web or arm 15 which has a straight axial hole 15b for the screw 22. This screw 22 also will pull stub pin 19 tightly into bore 16 of stub 14.

The assembly is now carried or supported by the bearing head 24 the top half of which is forged with the engine block and is provided with a cap 25 and which is to be of equal width with the outside race of bearing 23.

This anti-friction bearing may consist of single or double row ball bearings or roller bearing or Timken roller bearing whichever is found to be more suitable.

It is to be understood that the invention as herein disclosed may be varied from the details described and shown without departure from the spirit of the subjoined claim.

I claim:

A crank shaft wrist pin construction, comprising a crank arm, a stub pin cast integral therewith and having a circular outside cross section, said pin having a free end, a tapered bore formed axially in said pin from the free end thereof, a second crank arm, a pin cast integral with an end of the second arm and tapered for axial insertion into said bore, said bore having a tapered longitudinal spline groove, a tapered spline forming an integral milled part of said tapered pin for engagement in said groove, means for coupling said pins and drawing the tapered pin into the stub pin, each of the crank arms being formed to provide a shoulder face encircling the pin which is integral therewith, and the diameters of the bore and tapered pin being such that when the tapered pin is firmly in the bore of the stub pin the free end of the stub pin will be closely adjacent to the shoulder adjacent to the tapered pin and the tapered end of the tapered pin will be spaced from the inner end of the tapered bore, the said tapered spline groove terminating a substantial distance short of the inner end of the tapered bore and the said tapered spline terminating short of the inner end of the spline groove when the tapered pin is fully inserted into the bore of the stub pin.

MELVIN SHULDA.

REFERENCES CITED

The following references are of record in the file of this patent:

UNITED STATES PATENTS

| Number | Name | Date |
|---|---|---|
| 852,199 | Poehner | Apr. 30, 1907 |
| 1,772,631 | Mead | Aug. 12, 1930 |

FOREIGN PATENTS

| Number | Country | Date |
|---|---|---|
| 534,405 | France | Jan. 5, 1922 |
| 544,025 | France | June 14, 1922 |
| 552,881 | France | Jan. 31, 1923 |
| 690,609 | France | June 23, 1930 |